US012625003B2

(12) United States Patent (10) Patent No.: US 12,625,003 B2
Gitzel et al. (45) Date of Patent: May 12, 2026

(54) SYSTEM FOR MONITORING A SWITCHGEAR

(71) Applicant: ABB Schweiz AG, Baden (CH)

(72) Inventors: Ralf Gitzel, Mannheim (DE); Tomas Kozel, Brno (CZ)

(73) Assignee: ABB Schweiz AG, Baden (CH)

( * ) Notice: Subject to any disclaimer, the term of this patent is extended or adjusted under 35 U.S.C. 154(b) by 560 days.

(21) Appl. No.: 18/154,493

(22) Filed: Jan. 13, 2023

(65) Prior Publication Data

US 2023/0228625 A1 Jul. 20, 2023

(30) Foreign Application Priority Data

Jan. 14, 2022 (EP) ..................................... 22151523

(51) Int. Cl.
*G01J 5/00* (2022.01)
*G06T 7/00* (2017.01)
(Continued)

(52) U.S. Cl.
CPC .......... *G01J 5/0066* (2013.01); *G06T 7/0008* (2013.01); *G06V 10/82* (2022.01); *G09G 5/377* (2013.01);
(Continued)

(58) Field of Classification Search
None
See application file for complete search history.

(56) References Cited

U.S. PATENT DOCUMENTS

| | | | |
|---|---|---|---|
| 2013/0031522 A1* | 1/2013 | Robles | G06F 30/398 |
| | | | 716/112 |
| 2013/0250102 A1* | 9/2013 | Scanlon | H04N 23/23 |
| | | | 348/143 |

(Continued)

FOREIGN PATENT DOCUMENTS

| | | |
|---|---|---|
| CA | 2260193 A1 | 1/1998 |
| CN | 201041515 Y | 3/2008 |

(Continued)

OTHER PUBLICATIONS

Gitzel et al., "Automatic Analysis of Thermograms—Challenge in Thermal Monitoring of Switchgears Using Infrared Cameras," Cired 2021—*The 26th International Conference and Exhibition on Electricity Distribution*, 5 pp. (Sep. 20-23, 2021).
(Continued)

*Primary Examiner* — Erica S Lin
(74) *Attorney, Agent, or Firm* — Fitch Even Tabin & Flannery LLP

(57) ABSTRACT

A system for monitoring a switchgear includes an infrared camera; a processing unit; and an output unit. The infrared camera acquires a first infrared image having a first number of pixels, and the processing unit determines a pixel in the first infrared image with a maximum temperature. The processing unit utilizes a second number less than the first number to determine a temperature interval for the first infrared image equal to a difference between the maximum temperature in the first infrared image and a threshold temperature in the first infrared image. The processing unit is configured to determine that a hot spot exists in the switchgear using the temperature interval for the first infrared image.

15 Claims, 3 Drawing Sheets

(51) Int. Cl.

| | |
|---|---|
| *G06V 10/82* | (2022.01) |
| *G09G 5/377* | (2006.01) |
| *H04N 23/20* | (2023.01) |

(52) U.S. Cl.
CPC ... *H04N 23/20* (2023.01); *G06T 2207/10048*
(2013.01)

(56) References Cited

U.S. PATENT DOCUMENTS

| | | | |
|---|---|---|---|
| 2017/0094228 A1* | 3/2017 | Israelson | .............. G06T 3/4038 |
| 2017/0201696 A1 | 7/2017 | Kobayashi | |
| 2021/0065357 A1 | 3/2021 | Gitzel | |
| 2021/0233219 A1 | 7/2021 | Wildermuth | |
| 2022/0011164 A1 | 1/2022 | Wildermuth | |

FOREIGN PATENT DOCUMENTS

| | | | |
|---|---|---|---|
| CN | 201096525 Y | 8/2008 |
| CN | 204270461 U | 4/2015 |
| CN | 205070199 U | 3/2016 |
| CN | 205883160 U | 1/2017 |
| CN | 206835046 U | 1/2018 |
| CN | 107917761 A | 4/2018 |
| CN | 109215042 A | 1/2019 |
| CN | 208672148 U | 3/2019 |
| CN | 208707596 U | 4/2019 |
| CN | 109829417 A | 5/2019 |
| CN | 109993736 A | 7/2019 |
| CN | 209197907 U | 8/2019 |
| CN | 110635768 A | 12/2019 |
| CN | 111080691 A | 4/2020 |
| CN | 210327503 U | 4/2020 |
| CN | 210693862 U | 6/2020 |
| CN | 111445487 A | 7/2020 |
| CN | 112305382 A | 2/2021 |
| CN | 112906576 A | 6/2021 |
| CN | 113191383 A | 7/2021 |
| CN | 113678165 A | 11/2021 |
| CN | 113920097 A | 1/2022 |
| EP | 3716205 A1 | 9/2020 |
| EP | 3786598 A1 | 3/2021 |
| EP | 3859674 A1 | 8/2021 |

OTHER PUBLICATIONS

Yan et al., "A Real-Time IR-Fusion Switchgear Contact Monitoring System (SCMS)," *IEEE Access*, 5: 12114-12124 (May 25, 2017).
European Patent Office, Extended European Search Report in European Patent Application No. 22151523.2, 10 pp. (Jul. 1, 2022).
Office Action and Search Report issued in corresponding Chinese Application No. 202310040467.8; dated Mar. 14, 2026; in Chinese with English translation (12 pages).

* cited by examiner

SYSTEM FOR MONITORING A SWITCHGEAR

CROSS-REFERENCE TO RELATED APPLICATIONS

This patent application claims priority to European Patent Application No. 22151523.2, filed on Jan. 14, 2022, which is incorporated herein in its entirety by reference.

FIELD OF THE DISCLOSURE

The present disclosure relates to a system for monitoring a switchgear, a method for monitoring a switchgear, to a switchgear having such a system, and a computer program element.

BACKGROUND OF THE INVENTION

Electrical equipment such as switchgear can suffer from small faults that change the electrical resistance of the system. These faults manifest as hot spots and can ultimately lead to catastrophic failures. Here a switchgear can be a high voltage, medium voltage, or low voltage switchgear.

One solution is to monitor parts of the switchgear, such as the phases, with an infrared thermographic camera to detect the hot spots. This is because infrared (IR) images can be used to identify technical problems within electrical equipment (e.g., switchgear) that lead to the overheating of components and to identify the hot spots themselves.

However, while a human is quite capable of recognizing hot spots from infrared images, monitoring 24 hours a day every day is required meaning that an automated system is required, and it is not simple for an automated system to determine from infrared imagery whether there is a hot spot.

BRIEF SUMMARY OF THE INVENTION

The present disclosure describes a system and method for monitoring a switchgear. It is to be noted that the system is described with respect to a switchgear, but finds utility in other electrical system than can suffer from components that overheat.

In an aspect, there is provided a system for monitoring a switchgear. The system comprises:

an infrared camera;
a processing unit; and
an output unit.

The infrared camera is configured to acquire a first infrared image of the switchgear, wherein a total number of pixels in the first infrared image is equal to a first number. The processing unit is configured to determine a pixel in the first infrared image with a maximum temperature in the first infrared image. The processing unit is configured to utilize a second number less than the first number to determine a temperature interval for the first infrared image equal to a difference between the maximum temperature in the first infrared image and a threshold temperature in the first infrared image.

The processing unit is configured to determine the threshold temperature in the first infrared image as a pixel temperature in the first infrared image that results in a number of pixels in the first infrared image having a temperature between the threshold temperature in the first infrared image and the maximum temperature in the first infrared image that most closely matches the second number. The processing unit is configured to determine that a hot spot exists in the switchgear. The determination that the hot spot exists comprises utilization of the temperature interval for the first infrared image. The output unit is configured to output an indication of a fault in the switchgear when the determination has been made that a hot spot exists in the switchgear.

BRIEF DESCRIPTION OF THE SEVERAL VIEWS OF THE DRAWING(S)

DETAILED DESCRIPTION OF THE INVENTION

Figure 1:
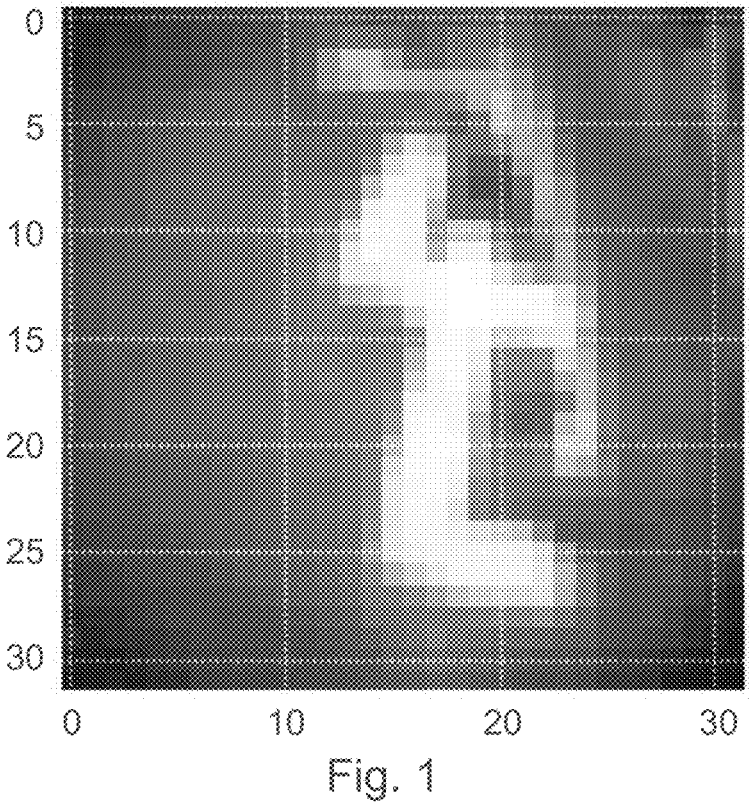
FIG. 1 is an exemplary infrared image of a switchgear in accordance with the disclosure.

FIGS. 1-6 provide details explaining a new system for monitoring a switchgear. The system comprises an infrared camera, a processing unit, and an output unit. The infrared camera is configured to acquire a first infrared image of the switchgear. A total number of pixels in the first infrared image is equal to a first number. The processing unit is configured to determine a pixel in the first infrared image with a maximum temperature in the first infrared image. The processing unit is configured to utilize a second number less than the first number to determine a temperature interval for the first infrared image equal to a difference between the maximum temperature in the first infrared image and a threshold temperature in the first infrared image. The utilization of the second number involves the following: the processing unit is configured to determine the threshold temperature in the first infrared image as a pixel temperature in the first infrared image that results in a number of pixels in the first infrared image having a temperature between the threshold temperature in the first infrared image and the maximum temperature in the first infrared image that most closely matches the second number. The processing unit is configured to determine that a hot spot exists in the switchgear. The determination that the hot spot exists comprises utilization of the temperature interval for the first infrared image. The output unit is configured to output an indication of a fault in the switchgear when the determination has been made that a hot spot exists in the switchgear.

In an example, the second number is determined from an infrared image captured by the infrared camera, or an equivalent infrared camera, of the switchgear, or an equivalent switchgear, such that the second number is a number of pixels in the infrared image that have the highest temperature values and that cover the parts of the switchgear, such as the phases or parts of the phases, that are required to be monitored.

According to an example, the second number is a fixed number.

According to an example, the second number is a predetermined number.

According to an example, the second number is determined from one or more calibration infrared images of the, or a similar, switchgear.

According to an example, the determination that the hot spot exists comprises utilization of the maximum temperature in the first infrared image.

According to an example, the determination that the hot spot exists comprises a determination that the temperature interval for the first infrared image is greater than a threshold temperature interval value.

According to an example, the threshold temperature interval value is determined as a function of the maximum temperature in the first infrared image.

According to an example, the infrared camera is configured to acquire a second infrared image of the switchgear after acquisition of the first infrared image of the switchgear. A total number of pixels in the second infrared image is equal to the first number. The processing unit is configured to determine a pixel in the second infrared image with a maximum temperature in the second infrared image. The processing unit is configured to utilize the second number to determine a temperature interval for the second infrared image equal to a difference between the maximum temperature in the second infrared image and a threshold temperature in the second infrared image. The utilization of the second number involves the following: the processing unit is configured to determine the threshold temperature in the second infrared image as a pixel temperature in the second infrared image that results in a number of pixels in the second infrared image having a temperature between the threshold temperature in the second infrared image and the maximum temperature in the second infrared image that most closely matches the second number. The processing unit is configured to determine that the hot spot exists in the switchgear on the basis that the temperature interval for the second infrared image is greater than the temperature interval for the first infrared image.

In an example, the processing unit is configured to determine that the hot spot exists in the switchgear on the basis that the temperature interval for the second infrared image is greater than the temperature interval for the first infrared image by a set amount.

In an example, the set amount is 0.5 C, 1 C, 1.5 C . . . 3 C.

In an example, the set amount is determined as a function of the maximum temperature.

According to an example, the infrared camera is configured to acquire a plurality of infrared images of the switchgear after acquisition of the first infrared image of the switchgear. A total number of pixels in each of the plurality of infrared images is equal to the first number. The processing unit is configured to determine a pixel in each of plurality of infrareds image with a maximum temperature in the each of the plurality of infrared images. The processing unit is configured to utilize the second number to determine a temperature interval for each of the plurality of infrared images equal to a difference between the maximum temperature in the each of the plurality of infrared images and a threshold temperature in each of the plurality of infrared images. The utilization of the second number involves the following: the processing unit is configured to determine the threshold temperature in each of the plurality of infrared images as a pixel temperature in each of the plurality of infrared images that results in a number of pixels in each of the plurality of infrared images having a temperature between the threshold temperature in each of the plurality of infrared images and the maximum temperature in each of the plurality of infrared images that most closely matches the second number. The processing unit is configured to determine that the hot spot exists in the switchgear on the basis of a rate of change between adjacent temperature intervals of the temperature interval for the first infrared image and the temperature intervals for the plurality of infrared images.

According to an example, the determination that the hot spot exists comprises utilization of a machine learning algorithm According to an example, the machine learning algorithm is a trained neural network.

According to an example, the system comprises a visible camera configured to acquire a visible image of the switchgear, and wherein the processing unit is configured to overlay a location of a maximum temperature in an infrared image onto a corresponding location in the visible image.

According to an example, the processing unit is configured to overlay locations of pixels having a temperature between a threshold temperature and the maximum temperature in an infrared image onto corresponding locations in the visible image.

From the above it is clear that a switchgear could be built having such a monitoring system as described above, or an existing switchgear could be retrofitted with such a system for monitoring a switchgear as described above.

Also, it is clear that an associated method for monitoring a switchgear comprises:

acquiring by an infrared camera a first infrared image of a switchgear, wherein a total number of pixels in the first infrared image is equal to a first number;

determining by a processing unit a pixel in the first infrared image with a maximum temperature in the first infrared image;

utilizing by the processing unit a second number less than the first number to determine a temperature interval for the first infrared image equal to a difference between the maximum temperature in the first infrared image and a threshold temperature in the first infrared image, wherein the utilizing comprises determining by the processing unit the threshold temperature in the first infrared image as a pixel temperature in the first infrared image that results in a number of pixels in the first infrared image having a temperature between the threshold temperature in the first infrared image and the maximum temperature in the first infrared image that most closely matches the second number;

determining by the processing unit that a hot spot exists in the switchgear, wherein the determining that the hot spot exists comprises utilizing the temperature interval for the first infrared image; and outputting by an output unit an indication of a fault in the switchgear when the determination has been made that a hot spot exists in the switchgear.

In an example, the second number is determined from an infrared image captured by the infrared camera, or an equivalent infrared camera, of the switchgear, or an equivalent switchgear, such that the second number is a number of pixels in the infrared image that have the highest temperature values and that cover the parts of the switchgear, such as the phases or parts of the phases, that are required to be monitored.

In an example, the second number is a fixed number.

In an example, the second number is a predetermined number.

In an example, the second number is determined from one or more calibration infrared images of the, or a similar, switchgear.

In an example, the determining that the hot spot exists comprises utilizing the maximum temperature in the first infrared image.

In an example, the determining that the hot spot exists comprises determining that the temperature interval for the first infrared image is greater than a threshold temperature interval value.

In an example, the threshold temperature interval value is determined as a function of the maximum temperature in the first infrared image.

In an example, the method comprises:

acquiring by the infrared camera a second infrared image of the switchgear after acquisition of the first infrared image of the switchgear, wherein a total number of pixels in the second infrared image is equal to the first number, determining by the processing unit a pixel in the second infrared image with a maximum temperature in the second infrared image, utilizing by the processing unit the second number to determine a temperature interval for the second infrared image equal to a difference between the maximum temperature in the second infrared image and a threshold temperature in the second infrared image, wherein the utilizing comprises determining by the processing unit the threshold temperature in the second infrared image as a pixel temperature in the second infrared image that results in a number of pixels in the second infrared image having a temperature between the threshold temperature in the second infrared image and the maximum temperature in the second infrared image that most closely matches the second number, and determining by the processing unit that the hot spot exists in the switchgear on the basis that the temperature interval for the second infrared image is greater than the temperature interval for the first infrared image.

In an example, the method comprises determining by the processing unit that the hot spot exists in the switchgear on the basis that the temperature interval for the second infrared image is greater than the temperature interval for the first infrared image by a set amount.

In an example, the set amount is 0.5 C, 1 C, 1.5 C . . . 3 C.

In an example, the set amount is determined as a function of the maximum temperature.

In an example, the method comprises:

acquiring by the infrared camera a plurality infrared images of the switchgear after acquisition of the first infrared image of the switchgear, wherein a total number of pixels in each of the plurality of infrared images is equal to the first number, determining by the processing unit a pixel in each of plurality of infrareds image with a maximum temperature in the each of the plurality of infrared images, utilizing by the processing unit the second number to determine a temperature interval for each of the plurality of infrared images equal to a difference between the maximum temperature in the each of the plurality of infrared images and a threshold temperature in each of the plurality of infrared images, wherein the utilizing comprises determining by the processing unit the threshold temperature in each of the plurality of infrared images as a pixel temperature in each of the plurality of infrared images that results in a number of pixels in each of the plurality of infrared images having a temperature between the threshold temperature in each of the plurality of infrared images and the maximum temperature in each of the plurality of infrared images that most closely matches the second number, and determining by the processing unit that the hot spot exists in the switchgear on the basis of a rate of change between adjacent temperature intervals of the temperature interval for the first infrared image and the temperature intervals for the plurality of infrared images.

In an example, the determining that the hot spot exists comprises utilization of a machine learning algorithm.

In an example, the machine learning algorithm is a trained neural network.

In an example, the method comprises acquiring by a visible camera a visible image of the switchgear, and overlaying by the processing unit a location of a maximum temperature in an infrared image onto a corresponding location in the visible image.

In an example, the method comprises overlaying by the processing unit locations of pixels having a temperature between a threshold temperature and the maximum temperature in an infrared image onto corresponding locations in the visible image.

Continuing with the figures, the system and method for monitoring a switchgear is described in further detail, with respect to specific embodiments.

It is to be noted, that the basis for the new system and method for monitoring a switchgear is based around a new algorithm that is termed an inverse pixel count algorithm.

An infrared thermographic (IRT) image is essentially a matrix of temperature values or a grayscale image. An example is shown in FIG. 1. The image shows the phases of a medium-voltage switchgear which heat up because current is flowing through them. The same applies to a high-voltage switchgear and to a low-voltage switchgear.

Figure 2:
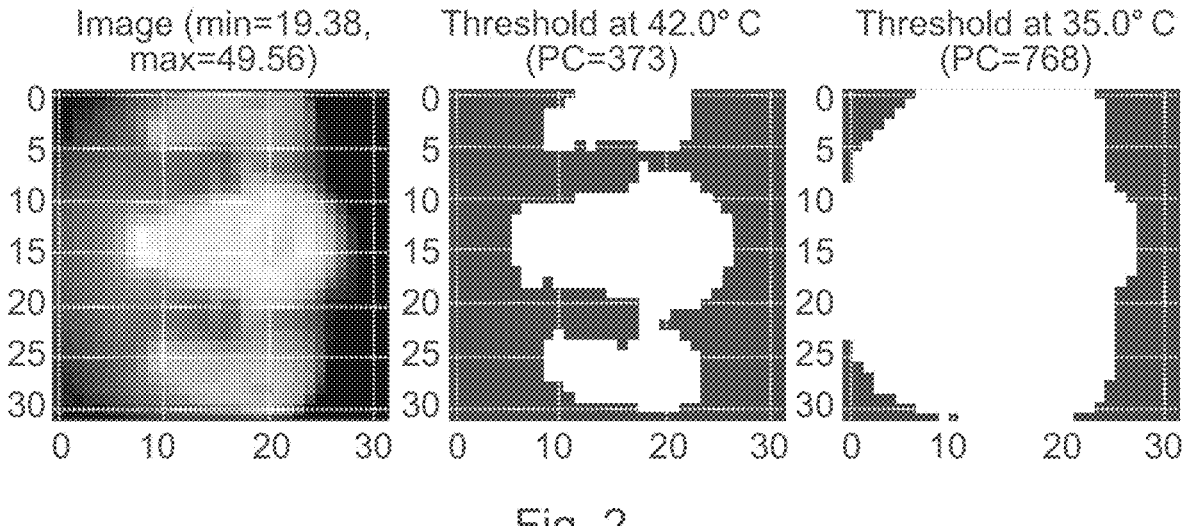
FIG. 2 is an exemplary infrared image of a switchgear, and examples of two different thresholds being applied to the infrared image, in accordance with the disclosure.
Figure 3:
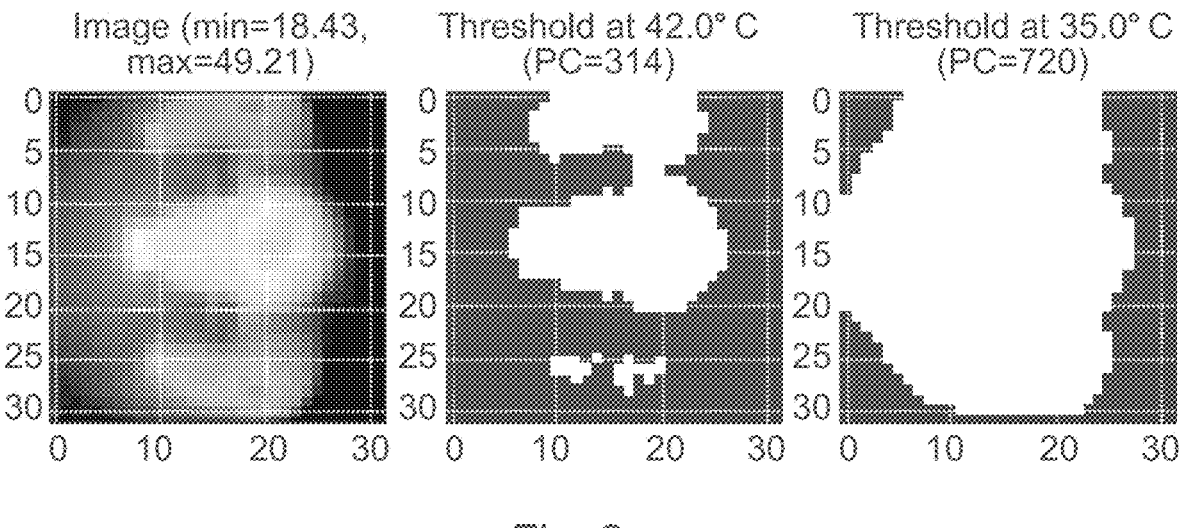
FIG. 3 is an exemplary infrared image of a switchgear with a hot spot and examples of the two different thresholds that were applied with respect to FIG. 2 now applied to the infrared image with the hot spot, in accordance with the disclosure.

By applying a threshold to the image, the image can be separated into two regions—a region where the temperature is above the threshold (t) and the region where it is below t. In FIG. 2, an IRT image from another switchgear compartment is shown where the maximum temperature is about 50° C. The image in the middle shows the result of applying a threshold of 42° C. All pixels hotter than or as hot as that are marked white, anything else is marked black. In the image on the right, a threshold of 35° C. is used. The lower the threshold, the more pixels will be included. Thus FIG. 2 in effect shows the effects of applying a threshold.

In the example of FIG. 2, there is a relatively clear distinction between an object (the phases, which are heated by Joule heating) and the background in the IRT image on the left. A threshold of about 42° C. (ca 8K below the maximum temperature) roughly reproduces the phases while removing the background (see middle image). When the phase is fully visible, the number of pixels above the threshold is 373 in this example. (This value is called the pixel count.) The lower threshold on the right has a higher pixel count—768.

The threshold used to obtain the "proper" middle image in FIG. 2 can be used to compute the temperature difference in the phase region. In the example, the temperature in the phases ranges from 42 to almost 50° C., so the temperature interval is 8K.

When the same thresholds are applied to an image with a hot spot but roughly the same maximum temperature (FIG. 3, left), the pixel count will be lower for an image with the same maximum temperature and the same threshold levels. The reason is that a bigger temperature interval would be needed to include all phases because the hot spot by definition has a higher temperature than the other phases. In other words as a hot spot spike in temperature starts to occur this maximum temperature becomes more separated from the temperatures of the other parts of the switchgear such that the number of pixels within a fixed threshold of the maximum become ever smaller as the hot spot increases in temperature. If for the same maximum temperature and the same temperature interval the pixel count is lower, there is a hot spot.

Figure 4:
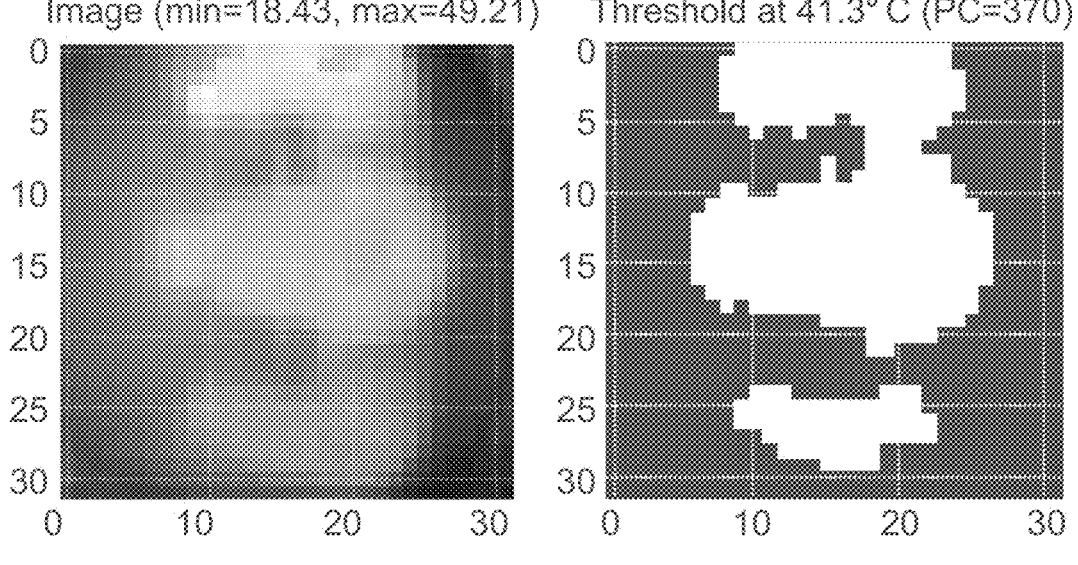
FIG. 4 is an exemplary infrared image of a switchgear with a hot spot as shown in FIG. 3 and an example of a threshold being applied that shows the three phases in a similar manner to the that shown in FIG. 2, for a healthy switchgear, in accordance with the disclosure.
Figure 5:
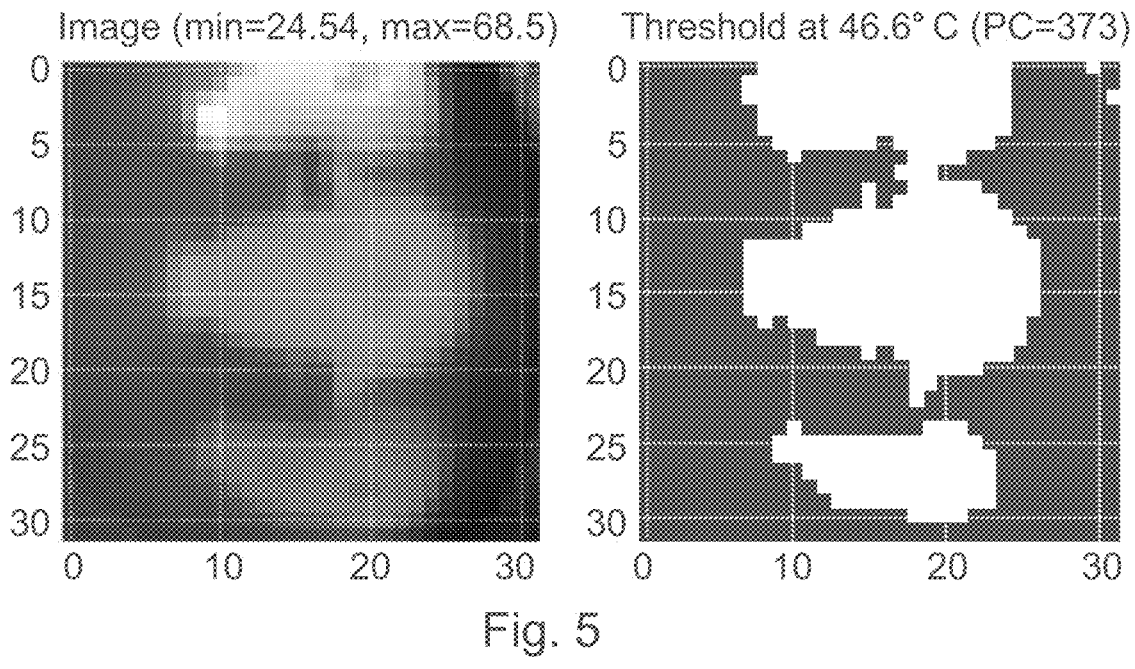
FIG. 5 is an exemplary infrared image of a switchgear with a hot spot as shown in FIG. 3 but that has increased in intensity and an example of a threshold being applied that shows the three phases in a similar manner to the that shown in FIG. 2 for a healthy switchgear, in accordance with the disclosure.

However, it was realized that, for the new system, a temperature interval need not be defined. Thus, in the new inverse pixel count algorithm there is no definition of a temperature interval and a counting of the pixels. Rather in the inverse pixel count algorithm a fixed pixel count is defined, and a determination is made of the required size of the interval. In FIG. 4, which shows the same hot spot image as FIG. 3, the threshold has been chosen such that the pixel count is as close to the value that fully shows all three phases. The image looks similar to the middle one in FIG. 2, which shows a healthy image.

The main difference, however, is that the temperature interval is slightly larger (9K vs 8K). As the hot spot grows in intensity, so does the required interval, which goes up to 21K in FIG. 5. Thus, the size of the interval can be used to classify faulty and healthy cases. If the temperature interval at the fixed pixel count is low, the temperature of the phases is homogeneous. If the interval is high, there is a hot spot.

Figure 6:
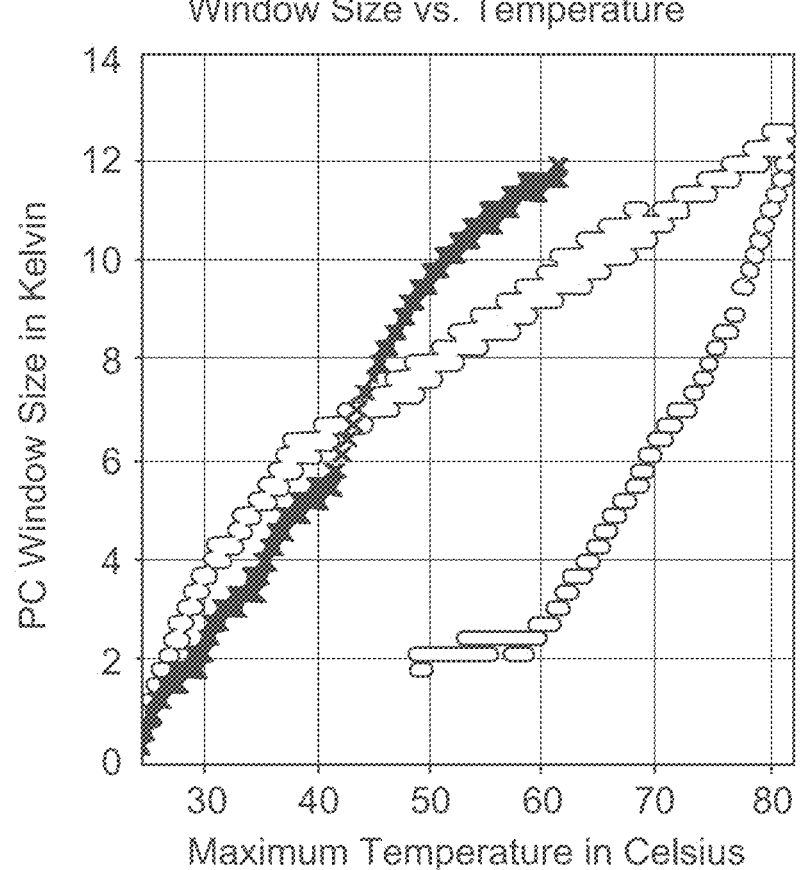
FIG. 6 is a plot of maximum temperature against a temperature interval for a healthy switchgear and for a switchgear with a developing hot spot in accordance with the disclosure.

The inverse pixel count algorithm can be used to distinguish faulty and healthy cases as can be seen in FIG. 6. A simple algorithm would use a line to separate healthy and faulty above a temperature of 45° C., where every interval above the line would be classified as faulty and anything below as healthy. In FIG. 6 it can be seen that above around 45 C in one case of increasing maximum temperature the temperature interval diverges upwards, above the generally monotonically increasing case for a healthy switchgear, thereby indicating that there is a hotspot. More complex algorithms can apply different rules at different temperatures. The interval size can also be used as one of several machine learning features including for example maximum image temperature, and derivatives of the maximum temperature and derivatives of the temperature interval.

In another exemplary embodiment, a computer program or computer program element is provided that is characterized by being configured to execute the method steps of the method according to one of the preceding embodiments, on an appropriate processor or system.

The computer program element might therefore be stored on a computer unit, which might also be part of an embodiment. This computing unit may be configured to perform or induce performing of the steps of the method described above. Moreover, it may be configured to operate the components of the above described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

In other words, infrared imagery of a switchgear is acquired, for example of the three phases. Each image could have 1024 pixels. A number such as 300 is selected. Then an image is analysed to determine the maximum or hottest temperature in an image. For example this could be 60.5 C. Then for a temperature threshold of 59 C there will be a number A of pixels between 59 C and 60.5 C, and for a temperature threshold of 58 C there will be a number B of pixels (where B is greater than A) between 58 C and 60.5 C. The processing unit therefore determines a temperature threshold, say 51.5 C, that results in a number of pixels (say 302) between 51.5 C and 60.5 C that is as close to the selected number (300) as possible. For example, a temperature threshold of 52 C may have resulted in a number of pixels equal to 295, and thus a threshold temperature of 51.5 C was the determined temperature threshold. The associated temperature interval is then 60.5 C minus 51.5 C equal to 9 C. And this temperature interval can be used to determine if there is a hot spot in the image.

In other words, a temperature span of for example current carrying phases of a switchgear can indicate is there is a hotspot without requiring a detailed understanding of the image structure.

In this manner, the new temperature monitoring system can be used to determine whether there are hot spots in the image that indicate faults in the switchgear system.

Also, a minimum amount of camera system configuration is required with respect to implementing such a switchgear monitoring system.

In an example, the second number is a fixed number.

In an example, the second number is a predetermined number.

In an example, the second number is determined from one or more calibration infrared images of the, or a similar, switchgear.

In an example, the determination that the hot spot exists comprises utilization of the maximum temperature in the first infrared image.

In this way, as the switchgear heats up a maximum temperature will gradually increase and for each maximum temperature it can be known what the temperature interval should be for a switchgear with no hot spots. Then, if for a maximum temperature the temperature interval is above that anticipated, it can be determined that there is a hot spot. Thus, it is not required to know whether the maximum temperature is normal or not, for example that would require to know at what time point in a heat-up stage the switchgear was, simply an indication that the temperature interval is above that anticipated for that maximum temperature is enough to indicate that there is a hotspot.

In an example, the determination that the hot spot exists comprises a determination that the temperature interval for the first infrared image is greater than a threshold temperature interval value.

In an example, the threshold temperature interval value is determined as a function of the maximum temperature in the first infrared image.

In an example, the infrared camera is configured to acquire a second infrared image of the switchgear after acquisition of the first infrared image of the switchgear, and a total number of pixels in the second infrared image is equal to the first number. The processing unit is configured to determine a pixel in the second infrared image with a maximum temperature in the second infrared image. The processing unit is configured to utilize the second number to determine a temperature interval for the second infrared image equal to a difference between the maximum temperature in the second infrared image and a threshold temperature in the second infrared image. The processing unit is configured to determine the threshold temperature in the second infrared image as a pixel temperature in the second infrared image that results in a number of pixels in the second infrared image having a temperature between the threshold temperature in the second infrared image and the maximum temperature in the second infrared image that most closely matches the second number. The processing unit is configured to determine that the hot spot exists in the switchgear on the basis that the temperature interval for the second infrared image is greater than the temperature interval for the first infrared image.

Thus for example, in operation in a steady state with constant current that should result in a constant maximum temperature or pseudo steady state with slight variations in current that can lead to variations in the maximum temperature, by monitoring the temperature interval between images it can be determined that there is a hotspot developing without. A hot spot can be identified and an alarm raised, whilst at the same time an increase in maximum temperature for a healthy system due to increased current can be identified as such because the temperature interval has either not increased or has not increased by a required amount to indicate that there is a hot spot.

In an example, the infrared camera is configured to acquire a plurality of infrared images of the switchgear after acquisition of the first infrared image of the switchgear, and a total number of pixels in each of the plurality of infrared images is equal to the first number. The processing unit is configured to determine a pixel in each of plurality of infrareds image with a maximum temperature in the each of the plurality of infrared images. The processing unit is configured to utilize the second number to determine a temperature interval for each of the plurality of infrared images equal to a difference between the maximum temperature in the each of the plurality of infrared images and a threshold temperature in each of the plurality of infrared images. The processing unit is configured to determine the threshold temperature in each of the plurality of infrared images as a pixel temperature in each of the plurality of infrared images that results in a number of pixels in each of the plurality of infrared images having a temperature between the threshold temperature in each of the plurality of infrared images and the maximum temperature in each of the plurality of infrared images that most closely matches the second number. The processing unit is configured to determine that the hot spot exists in the switchgear on the basis of a rate of change between adjacent temperature intervals of the temperature interval for the first infrared image and the temperature intervals for the plurality of infrared images.

In an example, the determination that the hot spot exists comprises utilization of a machine learning algorithm.

In an example, the machine learning algorithm is a trained neural network.

In an example, the system comprises a visible camera configured to acquire a visible image of the switchgear. The processing unit is configured to overlay a location of a maximum temperature in an infrared image onto a corresponding location in the visible image.

In an example, the processing unit is configured to overlay locations of pixels having a temperature between a threshold temperature and the maximum temperature in an infrared image onto corresponding locations in the visible image.

In other words, the location of hot pixels can be mapped to a visible image in order to allow a human to review the situation to determine if there is a fault.

In a second aspect, there is provided a switchgear comprising a system according to the first aspect.

In a third aspect, there is provided a method for monitoring a switchgear. The method comprises:

acquiring by an infrared camera a first infrared image of a switchgear, wherein a total number of pixels in the first infrared image is equal to a first number;

determining by a processing unit a pixel in the first infrared image with a maximum temperature in the first infrared image;

utilizing by the processing unit a second number less than the first number to determine a temperature interval for the first infrared image equal to a difference between the maximum temperature in the first infrared image and a threshold temperature in the first infrared image, wherein the utilizing comprises determining by the processing unit the threshold temperature in the first infrared image as a pixel temperature in the first infrared image that results in a number of pixels in the first infrared image having a temperature between the threshold temperature in the first infrared image and the maximum temperature in the first infrared image that most closely matches the second number;

determining by the processing unit that a hot spot exists in the switchgear, wherein the determining that the hot spot exists comprises utilizing the temperature interval for the first infrared image; and outputting by an output unit an indication of a fault in the switchgear when the determination has been made that a hot spot exists in the switchgear.

According to another aspect, there is provided a computer program element controlling one or more of the apparatuses and/or systems as previously described which, if the computer program element is executed by a processor, is adapted to perform the methods as previously described.

According to another aspect, there is provided a computer readable medium having stored a computer element as previously described.

The computer program element can for example be a software program but can also be a FPGA, a PLD or any other appropriate digital means.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for monitoring a switchgear, the system comprising:
an infrared camera;
a processing unit; and
an output unit;
wherein the infrared camera is configured to acquire a first infrared image of the switchgear, wherein a total number of pixels in the first infrared image is equal to a first number;
wherein the processing unit is configured to determine a pixel in the first infrared image with a maximum temperature in the first infrared image;

wherein the processing unit is configured to utilize a second number less than the first number to determine a temperature interval for the first infrared image equal to a difference between the maximum temperature in the first infrared image and a threshold temperature in the first infrared image;
wherein the processing unit is configured to determine the threshold temperature in the first infrared image as a pixel temperature in the first infrared image that results in a number of pixels in the first infrared image having a temperature between the threshold temperature in the first infrared image and the maximum temperature in the first infrared image that most closely matches the second number;
wherein the processing unit is configured to determine that a hot spot exists in the switchgear, wherein the determination that the hot spot exists comprises utilization of the temperature interval for the first infrared image; and
wherein the output unit is configured to output an indication of a fault in the switchgear when the determination has been made that a hot spot exists in the switchgear.

2. The system according to claim 1, wherein the second number is a fixed number.

3. The system according to claim 2, wherein the second number is a predetermined number.

4. The system according to claim 1, wherein the second number is determined from one or more calibration infrared images of the switchgear.

5. The system according to claim 1, wherein the determination that the hot spot exists comprises utilization of the maximum temperature in the first infrared image.

6. The system according to claim 1, wherein the determination that the hot spot exists comprises a determination that the temperature interval for the first infrared image is greater than a threshold temperature interval value.

7. The system according to claim 6, wherein the threshold temperature interval value is determined as a function of the maximum temperature in the first infrared image.

8. The system according to claim 1, wherein the infrared camera is configured to acquire a second infrared image of the switchgear after acquisition of the first infrared image of the switchgear, wherein a total number of pixels in the second infrared image is equal to the first number, wherein the processing unit is configured to determine a pixel in the second infrared image with a maximum temperature in the second infrared image, wherein the processing unit is configured to utilize the second number to determine a temperature interval for the second infrared image equal to a difference between the maximum temperature in the second infrared image and a threshold temperature in the second infrared image, wherein the processing unit is configured to determine the threshold temperature in the second infrared image as a pixel temperature in the second infrared image that results in a number of pixels in the second infrared image having a temperature between the threshold temperature in the second infrared image and the maximum temperature in the second infrared image that most closely matches the second number, wherein the processing unit is configured to determine that the hot spot exists in the switchgear on the basis that the temperature interval for the second infrared image is greater than the temperature interval for the first infrared image.

9. The system according to claim 1, wherein the infrared camera is configured to acquire a plurality infrared images of the switchgear after acquisition of the first infrared image of the switchgear, wherein a total number of pixels in each of the plurality of infrared images is equal to the first number, wherein the processing unit is configured to determine a pixel in each of plurality of infrareds image with a maximum temperature in the each of the plurality of infrared images, wherein the processing unit is configured to utilize the second number to determine a temperature interval for each of the plurality of infrared images equal to a difference between the maximum temperature in the each of the plurality of infrared images and a threshold temperature in each of the plurality of infrared images, wherein the processing unit is configured to determine the threshold temperature in each of the plurality of infrared images as a pixel temperature in each of the plurality of infrared images that results in a number of pixels in each of the plurality of infrared images having a temperature between the threshold temperature in each of the plurality of infrared images and the maximum temperature in each of the plurality of infrared images that most closely matches the second number, wherein the processing unit is configured to determine that the hot spot exists in the switchgear on the basis of a rate of change between adjacent temperature intervals of the temperature interval for the first infrared image and the temperature intervals for the plurality of infrared images.

10. The system according to claim 1, wherein the determination that the hot spot exists comprises utilization of a machine learning algorithm.

11. The system according to claim 10, wherein the machine learning algorithm is a trained neural network.

12. The system according to claim 1, wherein the system comprises a visible camera configured to acquire a visible image of the switchgear, and wherein the processing unit is configured to overlay a location of a maximum temperature in an infrared image onto a corresponding location in the visible image.

13. The system according to claim 12, wherein the processing unit is configured to overlay locations of pixels having a temperature between a threshold temperature and the maximum temperature in an infrared image onto corresponding locations in the visible image.

14. A method for monitoring a switchgear, the method comprising:

acquiring by an infrared camera a first infrared image of a switchgear, wherein a total number of pixels in the first infrared image is equal to a first number;

determining by a processing unit a pixel in the first infrared image with a maximum temperature in the first infrared image;

utilizing by the processing unit a second number less than the first number to determine a temperature interval for the first infrared image equal to a difference between the maximum temperature in the first infrared image and a threshold temperature in the first infrared image, wherein the utilizing comprises determining by the processing unit the threshold temperature in the first infrared image as a pixel temperature in the first infrared image that results in a number of pixels in the first infrared image having a temperature between the threshold temperature in the first infrared image and the maximum temperature in the first infrared image that most closely matches the second number;

determining by the processing unit that a hot spot exists in the switchgear, wherein the determining that the hot spot exists comprises utilizing the temperature interval for the first infrared image; and outputting by an output unit an indication of a fault in the switchgear when the determination has been made that a hot spot exists in the switchgear.

15. The system according to claim 4, wherein the second number is determined from one or more calibration infrared images of a second switchgear different from the switchgear.

* * * * *